United States Patent Office 3,330,965
Patented July 11, 1967

3,330,965
ART OF WELDING
Robert E. Sanders, Wausau, Wis., assignor to American Can Company, New York, N.Y., a corporation of New Jersey
No Drawing. Filed July 20, 1964, Ser. No. 383,913
4 Claims. (Cl. 29—490)

This invention relates to compositions useful in the cutting and welding of metals and more particularly to improved lignin-containing compositions which effectively reduce the adhesion of spattered molten metal droplets in the area of a workpiece immediately adjacent a weld formed for example, on a ferrous metal by an arc welding process.

The welding of metals such as iron and steel and also the cutting of these metals by means of a torch involve the momentary conversion of a portion of the solid metal in the immediate working area to a fused or molten state. This small pool of molten metal, under the influence of the violent local disturbance created by the heating means, tends to splash or spatter over the surrounding surfaces. Electric arc welding operations and metal cutting operations involving the use of an oxy-acetylene torch are particularly subject to this annoying phenomenon, since these operations are always accompanied by rather substantial splashing and spattering of small droplets of molten metal which are projected rather violently into the surrounding atmosphere from the area where the weld or cut is being formed. Many of these droplets travel only a few inches through the air before contacting a surface of the work piece, where they cool and solidify in more or less tightly adhered state, depending primarily on the temperature of the droplet when it contacts the workpiece surface. Spattered globules of molten metal which travel greater distances before touching the workpiece surface are generally sufficiently cooled by air contact so that they adhere to the workpiece surface only very lightly or not at all and are very easily removed by simple brushing with a wire-bristled brush. The tightly adhering globules or droplets close to the weld or cut area, however, are often extremely difficult to remove and form a tough, irregular area in the vicinity of the weld or cut which is often functionally undesirable as well as unsightly.

Attempts have been made both to reduce the extent of spattering which occurs during the cutting and welding processes and to reduce the adhesion of spattered metal droplets to the workpiece so that they may be readily removed by simple brushing, leaving a work surface free of objectionable spatterings. Unfortunately such attempts in the past have not met with signal success.

The present invention encompasses improved anti-spatter compositions which, when applied to the workpiece in the region surrounding a proposed weld area, will both reduce the amount of spattering which occurs during welding and also reduce the adhesion of spattered metal droplets to the surrounding workpiece surface. The compositions of this invention comprise aqueous solutions of the lignin compounds obtained from lignocellulosic materials by digestion at elevated temperatures and pressure in any of several well-known methods for the separation of cellulose pulp fibers from wood, straw, bagasse, corn stalks and similar fibrous lignocellulosic plants.

The commonly utilized commercial methods for the pulping of ligno-cellulose materials include the sulfite process with a calcium, magnesium, sodium or ammonium base, the kraft or sulfate process, the neutral sulfite semichemical process and the soda process. The spent lignocellulose pulping liquors from the sulfite process and the semi-chemical process contain sulfonated lignin in the form of water-soluble lignosulfonate salts of the respective cation utilized at the base, whereas the kraft process and soda process liquors contain alkali-soluble non-sulfonated lignin as the sodium salt. The spent lignocellulose pulping liquors from any of these processes may be utilized as such in this invention or may be concentrated in any of several well-known ways to a more concentrated solution which is more readily handled and more effective for this use. The concentrated solution can range up to about 60% solids, but solutions ranging from about 15% to about 45% solids concentration are generally most satisfactory for use in the present invention. If desired, the spent liquors may be processed or refined to enhance their desired properties for the present use. For example, the spent liquors from the calcium based sulfite process may be substantially freed of carbohydrate material present in such liquors either by fermentation or by precipitation of the lignosulfonate components by lime addition according to the Howard process disclosed in the United States Reissued Patent 18,268, Dec. 1, 1931, and in United States Patents No. 1,856,558, May 3, 1932 and 1,924,361, Aug. 29, 1933. In addition, the lignosulfonates, as well as being freed as far as possible of extraneous material such as carbohydrates, may be fractionated as to molecular weight components and may be treated by a variety of processes which modify and enhance their value in the present invention. One such process involve a partial desulfonation by an alkaline pressure cook in the presence of oxygen as disclosed in U.S. Patent 2,371,136. Lignosulfonate fractions derived in this manner from spent calcium bisulfite pulping liquors are of particular value in this invention.

Similarly the alkali-soluble lignin material present in spent lignocellulose pulping liquors from the kraft process may be refined and purified by precipitation, washing and re-dissolution or by other suitable refining and fractionating processes to yield materials of enhanced properties for the present use. It is therefore evident that the lignin components of the spent lignocellulosic pulping liquors, whether present as lignosulfonate salts or as alkali-soluble lignin, are the active factors in reducing the adhesion of weld spatters by the method of this invention. The preferred compositions are those containing the alkali-soluble lignin derived from spent kraft liquor and those containing water-soluble lignosulfonate components derived from spent calcium bisulfite pulping liquors of the so-called sulfite pulping process.

The lignin-containing material is applied to the work surface prior to the welding operation in any of a number of ways capable of forming a thin film of the material over the section of work surface adjacent the proposed weld. For example, the lignin material, preferably in aqueous solution, may be brushed, sprayed or wiped on the work surface or applied in any similarly conventional manner. Solutions in other solvents may also be employed, but water is generally preferred for reasons of economy and freedom from solvent odors and hazards. If desired, the solvent may be allowed to evaporate from the coated work surface before the welding operation is commenced, although it has been found that this is unnecessary and the welding may be carried out immediately after the application of the lignin-containing material if so desired.

Application of the lignin material by means of an aerosol-type spray container has been found extremely fast and convenient, although application by means of a paint brush is somewhat more economical. The concentration of the solution applied may vary substantially, from 15% to about 45% solids concentration being most convenient in application, although both higher and lower concentrations have been used with equal success if not equal facility. The amount of lignin material, in terms of weight of solids per unit of area which is required to be effective in reducing spatter adhesion varies somewhat depending on the distance from the actual weld area, a relatively heavy coating being desirable in the area closest to the weld, while thinner coatings suffice in more remote areas. When using a moderately concentrated solution (30–40% solids) of the lignin material, a simple brushing of the metal surface with a paint brush dipped in the lignin solution will adequately protect the metal surface from serious spattering problems and the amount of lignin solids to be applied in a given instance will be readily apparent from simple trial and error tests.

The following example demonstrates the effectiveness of lignin-containing materials in reducing spattering and spatter adhesion in the electric arc welding of steel. In the example, vertically disposed mild steel sheets were arc welded to a horizontaly disposed sheet of the same material along the line of contact between the sheets. Prior to forming the weld, the area of each sheet within 2–3 inches of the proposed weld line was coated with an aqueous solution of the lignin material being tested by stroking with a paint brush dipped in an aqueous solution containing 30% solids by weight of the lignin material. The welds were then formed in customary manner without allowing the lignin solutions to dry. After welding, the normal spatter areas adjacent the weld and extending about 1 to 2 inches therefrom were inspected to estimate the degree of spatter and were then given a quick brushing with a wire-bristle brush applied with moderate pressure to remove loosely adhered globules of spattered metal. Comparable randomly selected sections of known area on each piece were then photographed, the photos enlarged and a careful count made of the number of spatter globules remaining adhered to the metal in the areas adjacent the weld line. For purposes of comparison, a blank weld was made in which the steel received no anti-spatter treatment, and a second blank was prepared in which the working surface was pre-treated with a standard, commercial, anti-spatter composition which contained no lignin.

The results obtained under the above conditions are tabulated in the following Table I.

TABLE I.—SPATTER ADHESION IN ARC-WELDING OF STEEL

| Pre-welding treatment of steel surface | Appearance of steel surface near weld area | Degree of spatter, measured in spatter particles per square inch after steel brushing |
|---|---|---|
| None-Blank | Heavy spattering | In excess of 500 per sq. in. |
| Commercial Anti-Spatter Compound. | do | 300–350 per sq. in. |
| Lignin Compound A | do | 125–150 per sq. in. |
| Lignin Compound B | Moderately heavy spattering. | 100–140 per sq. in. |
| Lignin Compound C | Moderate spattering | 10–25 per sq. in. |
| Lignin Compound D | do | 0–10 per sq. in. |

The lignin compounds used in the above example include (A) concentrated spent liquor from the calcium bisulfite process for recovery of cellulose paper pulp from wood, (B) sodium lignosulfonate obtained by stepwise treatment of spent calcium bisulfite spent liquor with lime in accordance with the Howard process followed by conversion of the resulting precipitated basic calcium lignosulfonate to the corresponding sodium salt, (C) a partially desulfonated lignosulfonate material prepared by pressure-cooking the Howard process basic calcium lignosulfonate under alkaline conditions with introduction of air followed by solvent extraction and clarification procedures to remove non-salt forming organics and inorganic sludge, and finally, (D) an alkali-soluble lignin material obtained by the sulfate or kraft process for recovery of cellulose paper pulp fibers from wood.

It will be noted that each of the lignin compositions derived from spent lignocellulose pulping liquors included in the above example resulted in a remarkable reduction of the droplets of metal adhering tightly to the areas adjacent the weld in comparison with an untreated blank and also with a sample treated with a commercially available anti-spatter composition.

In addition to acting as effective anti-spatter agents in the arc welding of various types of steel, the lignin-containing materials of this invention are also effective in spatter prevention by other welding methods, although the necessity for their use is much less acute in, for example, welding by an oxyacetylene torch, since spatter is a much less serious problem when this welding method is employed.

The lignin-containing materials of this invention are also of value as anti-spatter agents for use in cutting operations using an oxy-acetylene or similar cutting torch, wherein spatter on metal areas in the vicinity of the cutting operation is often a problem. The lignin-containing materials are utilized in the operation in much the same way as hereinbefore described in connection with welding operations.

As will be apparent to those skilled in the art, various modifications may be made which lie within the spirit of this invention. It is therefore intended that the invention not be limited except as defined in the appended claims.

I claim:

1. A method for reducing the adhesion of weld spatterings to a metallic workpiece which comprises applying to the workpiece surface in the proximity of the proposed weld an effective amount of a water-based solution of a metallic salt of a lignin material derived from spent lignin liquors obtained by the pulping of lignocellulosic material, and subsequently welding the workpiece in the area treated with said lignin material.

2. A method according to claim 1 in which said lignin material is alkali-soluble lignin derived from the spent liquors of the sulfate process for the separation of cellulose pulp fibers from wood.

3. A method according to claim 1 in which said lignin material is a water-soluble metal salt of lignosulfonates derived from the sulfite process for the separation of cellulosic pulp fibers from wood.

4. In the welding of ferrous metal by the electric arc process, the improvement which comprises applying a water-based solution of an effective amount of a metallic salt of a lignin material derived from spent lignocellulose pulping liquors to the workpiece surface in the proximity of the proposed weld area prior to welding the workpiece, whereby said lignin material substantially reduces the adhesion to the workpiece of metal spatterings resulting from the welding.

References Cited

UNITED STATES PATENTS

| 2,394,101 | 1/1946 | Phillips et al. | 117—6 |
| 2,446,922 | 8/1948 | Grundner | 219—137 X |
| 2,798,001 | 7/1957 | O'Neil et al. | 106—38.23 |

JOHN F. CAMPBELL, *Primary Examiner.*

L. J. WESTFALL, *Assistant Examiner.*